US012602568B2

(12) United States Patent
Jiang et al.

(10) Patent No.: US 12,602,568 B2
(45) Date of Patent: Apr. 14, 2026

(54) BORN-AGAIN TSK FUZZY CLASSIFIER BASED ON KNOWLEDGE DISTILLATION

(71) Applicant: Huzhou University, Huzhou (CN)

(72) Inventors: Yunliang Jiang, Huzhou (CN);
Xiongtao Zhang, Huzhou (CN);
Jungang Lou, Huzhou (CN); Qing Shen, Huzhou (CN); Jiangwei Weng,
Qingdao (CN)

(73) Assignee: Huzhou University, Huzhou (CN)

( * ) Notice: Subject to any disclaimer, the term of this patent is extended or adjusted under 35 U.S.C. 154(b) by 559 days.

(21) Appl. No.: 18/331,450

(22) Filed: Jun. 8, 2023

(65) Prior Publication Data

US 2023/0401424 A1     Dec. 14, 2023

(30) Foreign Application Priority Data

Jun. 9, 2022     (CN) .......................... 202210651346.2

(51) Int. Cl.
G06N 3/043        (2023.01)
G06N 3/08         (2023.01)
(52) U.S. Cl.
CPC ............... G06N 3/043 (2023.01); G06N 3/08 (2013.01)
(58) Field of Classification Search
CPC ............ G06N 3/043; G06N 3/08; G06N 3/09;
G06N 3/048; G06N 3/0464; G06N 3/084;
G06N 3/096; G06N 7/02; A61B 5/372;
A61B 5/4094; A61B 5/7267
See application file for complete search history.

(56) References Cited

U.S. PATENT DOCUMENTS

| | | | | |
|---|---|---|---|---|
| 5,245,695 A * | 9/1993 | Basehore | ................. | G06N 7/04 |
| | | | | 706/900 |
| 6,748,369 B2 * | 6/2004 | Khedkar | ................ | G06N 3/043 |
| | | | | 706/6 |
| 11,410,029 B2 * | 8/2022 | Fukuda | .................... | G06N 3/08 |

OTHER PUBLICATIONS

Distilling a Deep Neural Network into a Takagi-Sugeno-Kang Fuzzy Inference System (Year: 2020).*
The Scalable Fuzzy Inference-Based Ensemble Method for Sentiment Analysis (Year: 2022).*
A CNN-Based Born-Again TSK Fuzzy Classifier Integrating Soft Label Information and Knowledge Distillation (Year: 2023).*
(Continued)

*Primary Examiner* — Christopher E Dunay
(74) *Attorney, Agent, or Firm* — Quarles & Brady LLP

(57) ABSTRACT

This application provides a born-again TSK fuzzy classifier based on knowledge distillation. The born-again TSK fuzzy classifier based on knowledge distillation is denoted as CNNBaTSK, and a fuzzy rule of CNNBaTSK includes two parts: an antecedent part based on soft label information and a consequent part based on original data. A method for constructing the fuzzy rule of CNNBaTSK includes following steps: Step 1: taking, by the CNNBaTSK, the original data as input, obtaining a probability distribution of an output layer through a layer-by-layer neural expression, and introducing a distillation temperature to generate soft label information of DATASET; Step 2: partitioning the soft label information into five fixed fuzzy partitions to construct the fuzzy rule in a fuzzy part of the CNNBaTSK; Step 3: introducing the original data to calculate a consequent parameter, and optimizing the consequent parameter of CNNBaTSK using a non-iterative learning method.

12 Claims, 4 Drawing Sheets

(56)     References Cited

OTHER PUBLICATIONS

Article; arXiv:2010.04974v1 [cs.AI] Oct. 10, 2020; Distilling a Deep Neural Network into a Takagi-Sugeno-Kang Fuzzy Inference System; Xiangming Gu, Tsinghua University, 30 Shuangqing Rd, Beijing, China; Xiang Cheng, National University of Singapore, 21 Lower Kent Ridge Rd, Singapore.

* cited by examiner

BORN-AGAIN TSK FUZZY CLASSIFIER BASED ON KNOWLEDGE DISTILLATION

CROSS-REFERENCE TO RELATED APPLICATION

This application claims priority to Chinese Patent Application No. 2022106513462, filed on Jun. 9, 2022, which is hereby incorporated by reference in its entirety.

TECHNICAL FIELD

This application relates to a technical field of classifier, in particular to a born-again TSK (Takagi-Sugeno-Kang) fuzzy classifier based on knowledge distillation.

BACKGROUND

Knowledge distillation, proposed by Hinton in a neural network community has been proven to be beneficial in numerous classification-task applications. The knowledge distillation strategy is firstly introduced by Xiangming Gu et al. ("Distilling a deep neural network into a takagi-sugeno-kang fuzzy inference system," arXiv preprint arXiv: 2010. 04974, 2020) to design a TSK fuzzy classifier, which can transfer knowledge from a complex convolutional neural network (CNN) to a concise TSK fuzzy classifier, thereby transferring the knowledge from a complex model to another concise model. Research has discovered that, the fuzzy classifier may be an effective method for handling fuzzy values extracted from the neural networks due to inherent advantages of fuzzy representation. However, how to transfer the fuzzy knowledge to the fuzzy classifier is still an urgent problem to be solved.

Epilepsy is a common neurological disease which is easily recurrent and difficult to cure. In the past few years, significant progress has been made in epilepsy electroencephalogram (EEG) signal recognition technology using EEG signal preprocessing, feature extraction, and classification both domestically and internationally. However, it is still challenging how to obtain effective features from original EEG signals and use machine learning methods such as Decision Tree and Support Vector Machine to achieve intelligent recognition of epilepsy EEG signals.

SUMMARY

This application aims to solve the problems in the prior art, and proposes a born-again TSK fuzzy classifier based on the knowledge distillation, which combines the fuzzy representation ability and the knowledge distillation strategy, and improves a generalization ability of model through a LLM-KD (least learning machine with knowledge distillation) algorithm, thereby improving classification performance.

In order to achieve the above object, this application proposes a born-again TSK fuzzy classifier based on knowledge distillation that is denoted as CNNBaTSK. Fuzzy rule of the CNNBaTSK includes two parts: an antecedent part based on soft label information and a consequent part based on original data. A method for constructing the fuzzy rule of CNNBaTSK includes following steps:

Step 1: taking, by the CNNBaTSK, the original data as input, obtaining a probability distribution of an output layer through a layer-by-layer neural expression, and introducing a distillation temperature to generate soft label information of DATASET;

Step 2: partitioning the soft label information into five fixed fuzzy partitions to construct the fuzzy rule in a fuzzy part of the CNNBaTSK;

Step 3: introducing the original data to calculate a consequent parameter, and optimizing the consequent parameter of CNNBaTSK using a non-iterative learning method.

Preferably, in Step 2, each soft label information in different fuzzy rules have a center of $\{0, 0.25, 0.5, 0.75,$ and $1\}$, respectively, and the soft label information is transformed into semantic interpretation to construct the fuzzy rule.

Preferably, in Step 1, a specific method of generating the soft label information of DATASET includes: firstly stacking multiple convolutional layers and pooling layers, in terms of layer by layer learning and generating a depth feature, the convolutional layers and the pooling layers used being disposed alternately, and then performing classification through several fully-connected layers and the output layer. The convolutional layer, the pooling layer, and the fully-connected layer are respectively denoted as a Conv layer, a Pool layer, and a FC layer.

Assuming that a training dataset is $X=\{x_i, x_i=(x_1, x_2, \ldots, x_n)^T, x_i \in R^n, i=1, 2, \ldots, N\}$ and a label set is $Y=\{Y_i, Y_i \in \{0, 1, \ldots, K\}, i=1, 2, \ldots, N\}$, where n represents a sample dimension, N represents a sample quantity, and K represents a sample category; in a convolutional neural network, an output result (feature map) of a layer t is marked as $Z_t$, where $Z_0$ represents the original data $x_i$.

In the Conv layer, a local connection method (convolutional kernel $W_t$) is employed to execute a convolution calculation, which can effectively reduce the number of parameters in the entire model, and then a bias be is added to the feature map, and then an activation function $f(\bullet)$ is employed for a nonlinear transformation; and a calculation process for the Conv layer is as follows:

$$Z_t = f(W_t * Z_{t-1} + b_t) \tag{1}$$

after the convolution calculation is completed, a nonlinear mapping of the PRelu activation function is performed, where, a mathematical expression of the PRelu is expressed as follows:

$$f(a) = \begin{cases} a, & \text{if } a > 0 \\ \kappa a, & \text{otherwise} \end{cases} \tag{2}$$

where, $\alpha$ represents an input variable and $\kappa$ represents a slope coefficient.

In the Pool layer, a maximum value in a pooling window is selected as a result in a selected maximum pooling operation in order to retain more texture features, and a pooling process may be expressed as follows:

$$Z_t = \text{Pool}(Z_{t-1}) \tag{3}$$

After several convolution and maximum pooling operations, an extracted depth feature is input into a first FC layer; in the FC layer, all neurons between layers are connected, and the depth feature is further mapped to a new feature space in order to complete a classification task; specifically, calculation is performed through a weight $W_t$ and the bias $b_t$, and a nonlinear transformation is performed using the activation function $f(\cdot)$; and a calculation process is as follows:

$$Z_t = f(W_t \cdot Z_{t-1} + b_t) \tag{4}$$

An output layer of the convolutional neural network uses Softmax activation function, and an output thereof $Z_t=(z_1, z_2, \ldots, z_K)^T$ is transformed into a corresponding probability result $E_t=(e_1, e_2, \ldots, e_K)^T$, where K represents the total number of category, and its calculation process is as follows:

$$e_K = \exp(z_K)/\sum_{k=1}^{K}\exp(z_k) \tag{5}$$

During the training process, a cross-entropy loss function is employed to measure a difference between the output of the convolutional neural network and a ground-truth label, and its calculation formula is as follows:

$$\min -\frac{1}{N}\sum_{i=1}^{N}\sum_{j=1}^{K}Y_{i,k}\log\left(e_k^{(E_i)}\right) \tag{6}$$

The weight $W_t$ and bias $b_t$ of the convolutional neural network are iterated and optimized through an error back-propagation algorithm; specifically, a loss value of formula (6) is backpropagated from a last layer to a first layer, and parameter updating is performed according to the error of each layer; assuming that a derivative of cross-entropy loss for the weight $W_t$ is $\Delta W_t$, and a derivative of cross-entropy loss for the bias $b_t$ is $\Delta b_t$, formula for parameter updating are expressed as follows:

$$W_t^l = W_t^l - \theta\Delta W_t^{l-1} \tag{7}$$

$$b_t^l = b_t^l - \theta\Delta b_t^{l-1} \tag{8}$$

where, l represents a training iteration epoch and $\theta$ represents a learning rate;

in order to facilitate the distinction, a probability distribution of the output layer softened by the distillation temperature T is called the soft label information $s_i=(s_1, s_2, \ldots, s_K)^T$, and its calculation method is as follows:

$$s_K = \exp(z_K/T)/\sum_{k=1}^{K}\exp(z_k/T) \tag{9}$$

In a binary-class classification task, it is assumed that the training dataset is expressed as $X=\{x_i, x_i=(x_1, x_2, \ldots, x_n)^T, x_i\in R^n, i=1, 2, \ldots, N\}$, $Y=\{Y_i, Y_i\in\{0,1\}, i=1, 2, \ldots, N\}$ is a ground-truth label vector of the binary-class classification task; the probability distribution of the output layer $E_i=(e_1, e_2)^T$ is transformed into the soft label information $S=\{s_i=(s_1, s_2)^T, s_k\in[0,1], k=1,2, i=1, 2, \ldots, N\}$ after introducing the distillation temperature T, where the sum of all probabilities in each sample is 1, that is, $s_1+s_2=1$.

Preferably, in Step 2, the CNNBaTSK adopts following fuzzy rules:

$$\text{In rule } m: \tag{10}$$

$$\text{IF } s_1 \text{ is } * \wedge s_2 \text{ is } *$$

$$\text{THEN } y^m = p_0^m + p_1^m x_1 + p_2^m x_2 + \ldots + p_n^m x_n.$$

$$m = 1, 2, \ldots, M$$

where, * denotes the membership of fuzzy partition, M is the total number of fuzzy rules and $\wedge$ denotes a fuzzy conjunction operator, and the consequent part adopts a linear function of the input data $x_i$;

the antecedent part of the soft label information is taken into five fixed fuzzy partitions, where each fuzzy partition has a center of $$c_d^m \in \{0, 0.25, 0.5, 0.75, 1\},$$

and the kernel width $$\sigma_d^m$$

is set at a random positive value which is between 0 and 1; then, a Gaussian membership function as a fuzzy membership function is applied to estimate a membership of each rule, and its calculation method is as follows:

$$\mu_m(s_{i,d}) = \exp\left(-(s_{i,d} - c_d^m)^2/2\sigma_d^m\right) \tag{11}$$

$$\mu_m(s_i) = \prod_{d=1}^{2}\mu_m(s_{i,d}) \tag{12}$$

a normalized membership function is formulated as follows:

$$\tilde{\mu}_m(s_i) = \mu_m(s_i)/\sum_{m'=1}^{M}\mu_{m'}(s_i) \tag{13}$$

therefore, the output $\tilde{y}_i$ of the CNNBaTSK can be expressed as:

$$\tilde{y}_i = \sum_{m=1}^{M}\tilde{\mu}_m(s_i)y^m \tag{14}$$

making:

$$p^m = (p_0^m, p_1^m, \ldots, p_n^m)^T \tag{15}$$

$$P = \left((p^1)^T, (p^2)^T, \ldots, (p^m)^T\right)^T \tag{16}$$

$$q_i^m = \tilde{\mu}_m(s_i)(l, x_i)^T \tag{17}$$

$$Q_i = \left((q_i^1)^T, (q_i^2)^T, \ldots, (q_i^m)^T\right)^T \tag{18}$$

5 the output $\tilde{y}_i$ of the CNNBaTSK may be expressed as:

$$\tilde{y}_i = Q_i^T P. \tag{19}$$

Preferably, in Step 3, a specific method for optimizing the consequent parameter of the CNNBaTSK is as follows.

A novel objective function is designed to balance the ground-truth label information and the soft label information, and a following objective function for optimization is proposed:

$$\min \frac{1}{2} \sum_{i=1}^{N} \zeta_i^2 + \frac{\alpha}{2} \|P\|_2^2 + \frac{\beta}{2} \sum_{i=1}^{N} \xi_i^2 \tag{20}$$

$$\text{s.t.} \begin{cases} Q_i^T P - Y_i = \zeta_i \\ Q_i^T P - s_{i,2} = \xi_i \end{cases}, i = 1, 2, \dots, N$$

where, P is the consequent parameter of the fuzzy rule, $\alpha$ and $\beta$ are regularization factors, $\zeta_i$ is a deviation between the prediction output and the ground-truth label, $\xi_i$ is a deviation between the prediction output and the soft label information; based on $s_1+s_2=1$ and the ground-truth label, index of the probability $s_2$ is matched with the ground-truth label.

A Lagrangian optimization formula of the objective function can be expressed as:

$$L(P, \zeta, \xi, \tau, \upsilon)) = \tag{21}$$

$$\frac{1}{2}\|\zeta\|_2^2 + \frac{\alpha}{2}\|P\|_2^2 + \frac{\beta}{2}\|\xi\|_2^2 - \tau(\tilde{Q}P - \tilde{Y} - \zeta) - \upsilon(-\tilde{Q}P - \tilde{S} - \xi)$$

where, $\zeta=(\zeta_1, \zeta_2, \dots, \zeta_N)^T$, $\xi=(\xi_1, \xi_2, \dots, \xi_N)^T$, $\tau=(\tau_1, \tau_2, \dots, \tau_N)^T$ and $\upsilon=(\upsilon_1, \upsilon_2, \dots, \upsilon_N)^T$ are Lagrangian multipliers with equality constraints, and an input matrix is denoted by $\tilde{Q}=(Q_1, Q_2, \dots, Q_N)^T$.

The consequent parameter P is calculated by setting a derivative gradient of the Lagrangian optimization formula with respect to (P, $\zeta$, $\xi$, $\tau$, $\upsilon$) equal to be zero, resulting in following KKT (Karush-Kuhn-Kucker) optimality conditions:

$$\begin{cases} \dfrac{\partial L}{\partial P} \Rightarrow \alpha P^T = \tau \tilde{Q} + \upsilon \tilde{Q} \\[4pt] \dfrac{\partial L}{\partial \zeta} \Rightarrow \zeta^T + \tau = 0 \\[4pt] \dfrac{\partial L}{\partial \xi} \Rightarrow \beta \xi^T + \upsilon = 0 \\[4pt] \dfrac{\partial L}{\partial \tau} \Rightarrow \tilde{Q}P - \tilde{Y} - \zeta = 0 \\[4pt] \dfrac{\partial L}{\partial \upsilon} \Rightarrow \tilde{Q}P - \tilde{S} - \xi = 0 \end{cases} \tag{22}$$

yielding:

$$\begin{cases} \tau = -(\tilde{Q}P - \tilde{Y})^T \\ \upsilon = -\beta(\tilde{Q}P - \tilde{S})^T \\ \alpha P^T = -(\tilde{Q}P - \tilde{Y})^T \tilde{Q} - \beta(\tilde{Q}P - \tilde{S})^T \tilde{Q} \end{cases} \tag{23}$$

6 therefore, an optimal analytical solution can be expressed as:

$$P = \left(\alpha I + (1 + \beta)\tilde{Q}^T \tilde{Q}\right)^{-1}\left(\tilde{Q}^T \tilde{Y} + \beta \tilde{Q}^T \tilde{S}\right) \tag{24}$$

where, I denotes an identity matrix.

Preferably, a learning algorithm of CNNBaTSK has inputs comprising: training dataset $X=\{x_i, x_i=(x_1, x_2, \dots, x_n)^T, x_i \in R^n, i=1, 2, \dots, N\}$ and $\tilde{Y}=\{Y_i, Y_i \in \{0, 1, \dots, K\}, i=1, 2, \dots, N\}$, and a maximum iteration epoch Î, initial learning rate $\theta$, the number of fuzzy rules M, distillation temperature T, regularization factors $\alpha$ and $\beta$, and testing sample $x_{test}$ of the convolutional neural network; outputs comprising: CNNBaTSK after completion of training, and the output $\tilde{y}_{test}$ of the testing sample; the learning algorithm of CNNBaTSK includes two stages as follows:

S1: training procedure:

S10: initialization: initializing $W_t$ and $b_t$ with random numbers, and proceeding step S11 to step S13 sequentially within a range of the maximum iteration epoch Î;

S11: inputting training samples $X=\{x_i, x_i=(x_1, x_2, \dots, x_n)^T, x_i \in R^n, i=1,2, \dots, N\}$, and performing a convolutional and pooling operation on the training samples through the Conv layer and the Pool layer to extract depth features;

S12: calculating a probability that the sample belongs to each label at the FC layer;

S13: performing error backpropagation on 1D-CNN (one-dimensional convolutional neural network) according to a cross-entropy loss function formula;

S14: generating a probability distribution $E_i=(e_1, e_2)^T$ of the output layer after the iteration is completed;

S15: introducing the distillation temperature T and converting it into the soft label information $S=\{s_i=(s_1,s_2)^T, s_k \in [0,1], k=1, 2, i=1, 2, \dots, N\}$;

S16: partitioning the antecedent part into five fixed fuzzy partitions, where the center of each fuzzy partition is $$c_d^m \in \{0, 0.25, 0.5, 0.75, 1\},$$

and the kernal width $$\sigma_d^m$$

is set at a random positive value which is between 0 and 1;

S17: computing a normalized membership $\tilde{\mu}^m(s_i)$ of the training sample in different rules;

S18: computing and generating $Q_i$, where the output of the CNNBaTSK can be expressed as $$\tilde{y}_i = Q_i^T P;$$

S19: computing an analytical solution for P to be $P=(\alpha I+(1+\beta)\tilde{Q}^T\tilde{Q}) (\tilde{Q}^T\tilde{Y}+\beta\tilde{Q}^T\tilde{S})$;

S2: testing stage:

S21: inputting a testing sample $x_{test}$;

S22: generating the probability distribution $E_{test}=(e_1, e_2)^T$ of the output layer;

S23: computing the probability distribution $s_{test}=(s_1, s_2)^T$ of the output layer of the soft label information;

S24: computing a normalized membership $\tilde{\rho}^{m}(s_i)$ of the testing sample in different rules;

S25: outputting $\tilde{y}_{test}$ of the testing sample according to $$\tilde{y}_{test} = Q_{test}^T P.$$

Beneficial effects of this application: 1) CNNBaTSK provides a new perspective of knowledge distillation in that it only calculates the parameters of the derived TSK fuzzy classifier without the entire retraining from the beginning and keeps the original neural network structure unchanged, which makes the proposed architecture suitable for all existing machine learning models. 2) CNNBaTSK adopts a novel least learning machine with knowledge distillation, denoted as LLM-KD. Compared with the gradient descent optimization technique, the consequents parameters of fuzzy rules can be learnt rapidly with the analytical solution obtained by LLMKD. Furthermore, LLM-KD is trained jointly on the ground-truth label loss, knowledge distillation loss, and regularization term to transfer more knowledge to the distilled model. Additionally, it better improves the generalization ability of the proposed CNNBaTSK. 3) The dark knowledge (soft label information) contains additional information about the similarities between different labels. Hence, the born-again CNNBaTSK builds up the interpretable antecedent part of the fuzzy rules to express the dark knowledge distilled from a CNN, which is to replace the original features with soft label information such that the fuzzy rules are more linguistically descriptive and the rule base is more compact. Original features are employed to train the consequent parameters of fuzzy rules, ensuring interpretability in the original feature space. 4) The universal approximation ability of CNNBaTSK is theoretically revealed, and the experimental results on benchmark datasets and the CHB-MIT EEG dataset demonstrate that, in contrast to the existing methods, CNNBaTSK is a promising method from different perspectives such as classification performance and interpretability.

The CNNBaTSK of this application has the following characteristics:

1) the CNNBaTSK provides a novel perspective of knowledge distillation, which adopts a non-iterative learning method to solve consequent parameters of fuzzy rules, where consequent parameters are trained jointly on ground-truth label loss, knowledge distillation loss and regularization term;

2) with the inherent advantage of the fuzzy rule, the CNNBaTSK has the capability to express the dark knowledge acquired from CNN in an interpretable manner. Specifically, the soft label information is partitioned into five fixed fuzzy spaces, and the centers of each soft label information in different fuzzy rules are {0, 0.25, 0.5, 0.75, and 1} respectively, which may have corresponding linguistic explanations: very low, low, medium, high, and very high. For the consequent part of the fuzzy rule, the original features are employed to train the consequent parameters, ensuring a direct interpretability of the consequent parameters in the original feature space.

The features and advantages of this application will be described in detail with reference to the accompanying drawings.

DESCRIPTION OF EMBODIMENTS

1. CNNBaTSK Model Architecture

Figure 1:
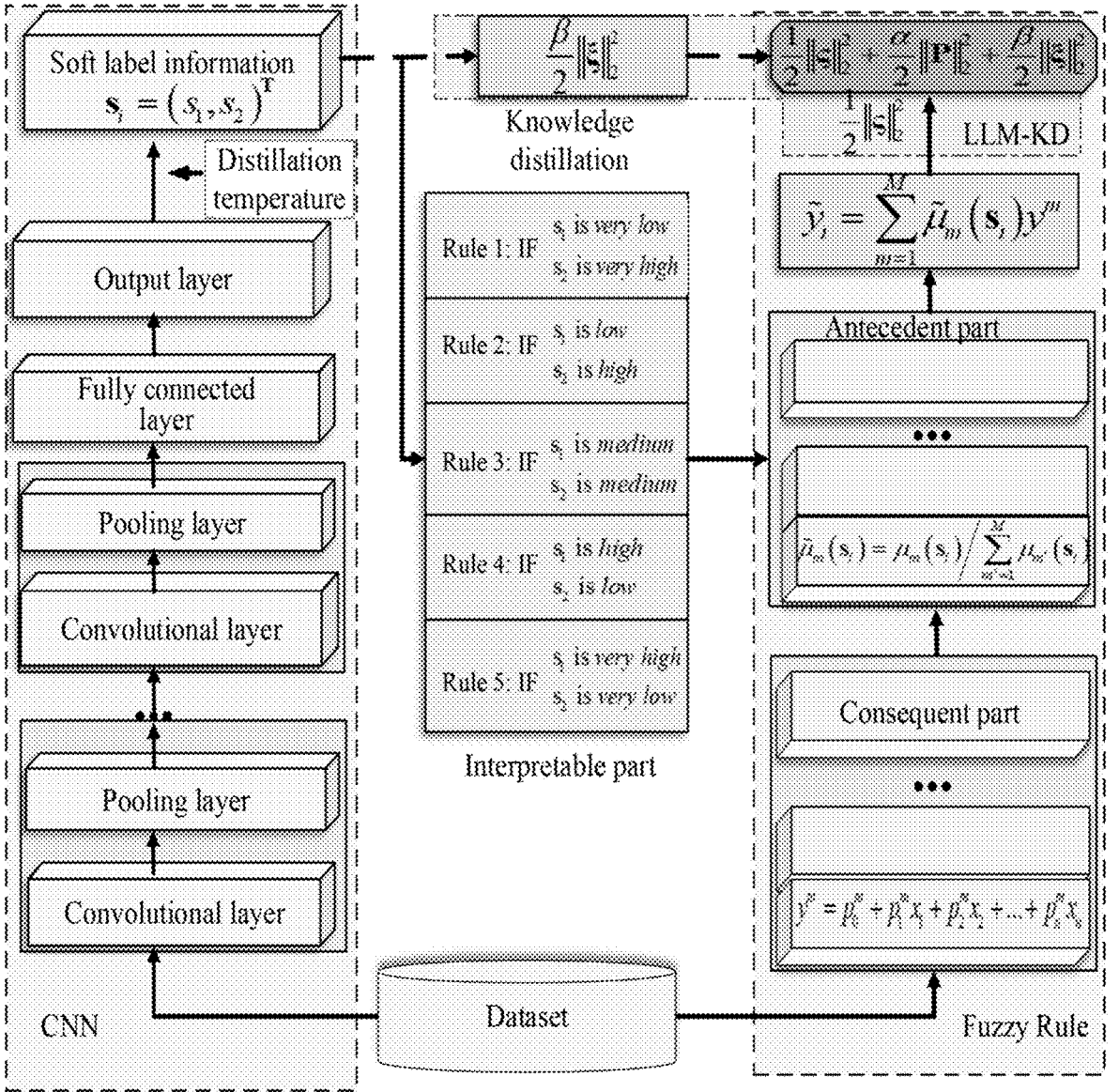
FIG. 1 is a structural block diagram of CNNBaTSK.

Dark knowledge (i.e., soft label information) is extracted from a convolutional neural network (CNN) that is trained, and contains additional information about a similarity between different labels. This application transfers the dark knowledge in the binary-class classification task from the convolutional neural network to an interpretable TSK fuzzy classifier, and proposes a born-again TSK fuzzy classifier with knowledge distillation based on the convolutional neural network, denoted as CNNBaTSK. As shown in FIG. 1, the CNNBaTSK takes the original data $x_i=(x_1, x_2, \ldots, x_n)^T$ as input to obtain the probability distribution $E_i=(e_1, e_2)^T$ of the output layer through a layer-by-layer neural expression, and then the distillation temperature T is introduced to generate a soft label information of DATASET $s_i=(s_1, s_2)^T$. In the fuzzy part of the CNNBaTSK, the soft label information is partitioned into five fixed fuzzy partitions. The centers of each soft label information in different fuzzy rules are {0, 0.25, 0.5, 0.75, and 1} respectively, which have corresponding linguistic explanations: very low, low, medium, high, and very high, thereby constructing more easily understandable fuzzy rules. Then, the original data is introduced to compute the consequent parameters, and the proposed LLM-KD algorithm is employed to optimize the consequent parameters of CNNBaTSK. Below, an implementation process of the CNNBaTSK is described in detail.

2. CNNBaTSK Implementation Process

By combining the training process of the convolutional neural network and the knowledge distillation method, the soft label information reflects the dark knowledge of differences between different categories in each sample.

First of all, multiple convolutional layers and pooling layers are stacked layer by layer to generate a depth feature; and the convolutional layers and pooling layers are alternately disposed, and then classification is performed through several fully-connected layers and output layers. The convolutional layer, pooling layer, and fully-connected layer are respectively denoted as a Conv layer, a Pool layer, and a FC layer.

Assuming that a training dataset is $X=\{x_i, x_i=(x_2, x_2, \ldots, x_n)^T, x_i \in R^n, i=1, 2, \ldots, N\}$ and a label set is $\tilde{Y}=\{Y_i, Y_i \in \{0, 1, \ldots, K\}, i=1, 2, \ldots, N\}$, where n represents a sample dimension, N represents a sample quantity, and K represents a sample category; in a convolutional neural network, an output result (feature map) of a layer t is marked as $Z_t$, where $Z_0$ represents the original data $x_i$.

In the Conv layer, a local connection method (convolutional kernel $W_t$) is employed to execute a convolution calculation, which can effectively reduce the number of parameters in the entire model, and then a bias $b_t$ is added to the feature map, and then an activation function $f(\cdot)$ is employed for a nonlinear transformation; and a calculation process for the Conv layer is as follows:

$$Z_t = f(W_t * Z_{t-1} + b_t) \tag{1}$$

after the convolution calculation is completed, a nonlinear mapping of the PRelu activation function is performed, where, a mathematical expression of the PRelu is expressed as follows:

$$f(a) = \begin{cases} a, & \text{if } 0 > 0 \\ \kappa a, & \text{otherwise} \end{cases} \tag{2}$$

where, $\alpha$ represents an input variable and K represents a slope coefficient.

In the Pool layer, a maximum value in a pooling window is selected as a result in a selected maximum pooling operation in order to retain more texture features, and a pooling process may be expressed as follows:

$$Z_t = \text{Pool}(Z_{t-1}) \tag{3}$$

After several convolution and maximum pooling operations, an extracted depth feature is input into a first FC layer; in the FC layer, all neurons between layers are connected, and the depth feature is further mapped to a new feature space in order to complete a classification task; specifically, calculation is performed through a weight $W_t$ and the bias $b_t$, and a nonlinear transformation is performed using the activation function $f(\bullet)$; and a calculation process is as follows:

$$Z_t = f(W_t \cdot Z_{t-1} + b_t) \tag{4}$$

An output layer of the convolutional neural network uses Softmax activation function, and an output thereof $Z_t = (z_1, z_2, \ldots, z_K)^T$ is transformed into a corresponding probability result $E_i = (e_1, e_2, \ldots, e_K)^T$, where K represents the total number of category, and its calculation process is as follows:

$$e_K = \exp(z_K)/\sum_{k=1}^{K} \exp(z_k) \tag{5}$$

During the training process, a cross-entropy loss function is employed to measure a difference between the output of the convolutional neural network and a ground-truth label, and its calculation formula is as follows:

$$\min - \frac{1}{N} \sum_{i=1}^{N} \sum_{k=1}^{K} Y_{i,k} \log(e_k^{(E_i)}) \tag{6}$$

The weight $W_t$ and bias $b_t$ of the convolutional neural network are iterated and optimized through an error back-propagation algorithm; specifically, a loss value of formula (6) is backpropagated from the last layer to the first layer, and parameter updating is performed according to the error of each layer; assuming that a derivative of cross-entropy loss for the weight $W_t$ is $\Delta W_t$, and a derivative of cross-entropy loss for the bias $b_t$ is $\Delta b_t$, formula for parameter updating are expressed as follows:

$$W_t^l = W_t^l - \theta \Delta W_t^{l-1} \tag{7}$$

$$b_t^l = b_t^l - \theta \Delta b_t^{l-1} \tag{8}$$

Where, l represents a training iteration epoch and $\theta$ represents a learning rate;

in order to facilitate the distinction, a probability distribution of the output layer softened by the distillation temperature T is called the soft label information $s_i = (s_1, s_2, \ldots, s_K)^T$, and its calculation method is as follows:

$$s_K = \exp(z_K/T)/\sum_{k=1}^{K} \exp(z_k/T) \tag{9}$$

In the binary-class classification task, it is assumed that the training dataset is expressed as $X = \{x_i, x_i = (x_1, x_2, \ldots, x_n)^T, x_i \in R^n, i=1, 2 \ldots, N\}$, $\tilde{Y} = \{Y_i, Y_i \in \{0,1\} \, i=1, 2, \ldots, N\}$ is the ground-truth label vector of the binary-class classification task. The probability distribution of the output layer $E_i = (e_1, e_2)^T$ can be transformed into the soft label information $S = \{s_i = (s_1, s_2)^T, s_k \in [0,1], k=1,2, i=1, 2, \ldots, N\}$ after introducing the distillation temperature T. At this point, there exists a very simple mathematical relationship herein, that is, the sum of all probabilities in each sample is 1, $s_1 + s_2 = 1$, which will be used below.

After the soft label information is obtained, the CNN-BaTSK proceeds into its fuzzy rule learning, and the CNN-BaTSK proposed by this application adopts the following fuzzy rules:

In rule m: IF $s_1$ is $*^\wedge s_2$ is $*$ THEN $y^m = \tag{10}$ $$p_0^m + p_1^m x_1 + p_2^m x_2 + \ldots + p_n^m x_n. \quad m = 1, 2, \ldots, M$$

where, $*$ denotes the membership of fuzzy partition, M is the total number of fuzzy rules and $\wedge$ denotes a fuzzy conjunction operator, and the consequent part adopts a linear function of the input data $x_i$.

The antecedent part of the soft label information is taken into five fixed fuzzy partitions, where each fuzzy partition has a center of $$c_d^m \in \{0, 0.25, 0.5, 0.75, 1\},$$

and the kernel width $$\sigma_d^m$$

is set at a random positive value which is between 0 and 1. Then, a Gaussian membership function as a fuzzy membership function is applied to estimate a membership of each rule, and its calculation method is as follows:

$$\mu_m(s_{i,d}) = \exp\left(-(s_{i,d} - c_d^m)^2 / 2\sigma_d^m\right) \qquad (11)$$

$$\mu_m(s_i) = \prod_{d=1}^{2} \mu_m(s_{i,d}) \qquad (12)$$

a normalized membership function is formulated as follows:

$$\tilde{\mu}_m(s_i) = \mu_m(s_i) \Big/ \sum_{m'=1}^{M} \mu_{m'}(s_i) \qquad (13)$$

therefore, the output $\tilde{y}_i$ of the CNNBaTSK can be expressed as:

$$\tilde{y}_i = \sum_{m=1}^{M} \tilde{\mu}_m(s_i) y^m \qquad (14)$$

making:

$$p^m = (p_0^m, p_1^m, \ldots, p_n^m)^T \qquad (15)$$

$$P = \left((p^1)^T, (p^2)^T, \ldots, (p^m)^T\right)^T \qquad (16)$$

$$q_i^m = \tilde{\mu}_m(s_i)(l, x_i)^T \qquad (17)$$

$$Q_l = \left((q_i^1)^T, (q_i^2)^T, \ldots, (q_i^m)^T\right)^T \qquad (18)$$

the output $\tilde{y}_i$ of the CNNBaTSK may be expressed as:

$$\tilde{y}_i = Q_i^T P. \qquad (19)$$

The CNNBaTSK firstly partitions the soft label information into five fixed fuzzy partitions and transforms it into semantic interpretations, thereby improving people's understanding for the differences between different categories in each sample. Based on this, this application further proposes a least learning machine algorithm based on knowledge distillation, which determines the consequent parameters by jointly considering the ground-truth label loss, knowledge distillation loss and regularization term.

3. Least Learning Machine Based on Knowledge Distillation

The knowledge distillation has a universal idea in the neural network community that is, it trains novel models by minimizing the cross-entropy loss and KL (Kullback-Leibler) divergence. The knowledge distillation is an adaptive version of label smoothing, showing that it generally inherits most of the advantages brought by label smoothing, which can improve the model generalization and avoid over-fitting. In the method of this application, a novel objective function is designed to balance the ground-truth label and the soft label information, and the proposed objective function for optimization is as follows:

$$\min \frac{1}{2} \sum_{i=1}^{N} \varsigma_i^2 + \frac{\alpha}{2} \|P\|_2^2 + \frac{\beta}{2} \sum_{i=1}^{N} \xi_i^2 \qquad (20)$$

$$\text{s.t.} \begin{cases} Q_i^T P - Y_i = \varsigma_i \\ Q_i^T P - s_{i,2} = \xi_i \end{cases}, \; i = 1, 2, \ldots, N$$

where, P is the consequent parameter of the fuzzy rule, $\alpha$ and $\beta$ are the regularization parameter, $\varsigma_i$ is a deviation between the prediction output and the ground-truth label, and $\xi_i$ is a deviation between the prediction output and the soft label information. During the extraction of the soft label information, the ground-truth label is in a form of a one-hot vector, however the ground-truth label and the soft label information should be converted into corresponding values. According to $s_1 + s_2 = 1$ and the ground-truth label, the index of the probability $s_2$ is matched with the ground-truth label of this disclosure.

The optimization criterion contains three parts. The first part learns from the ground-truth label and fit the training data as accurate as possible. The second part is a commonly used regularization method, which can effectively improve the generalization ability. The third part is the proposed knowledge distillation term, which is adopted to estimate the consequent parameters by approximating the soft label information obtained from the convolutional neural network. The parameters $\alpha$ and $\beta$ make a trade-off among these three parts, and the choice of the parameter $\beta$ has an important impact on knowledge distillation. For example, when $\beta=0$, the derived fuzzy classifier does not require knowledge distillation, that is, the classic optimization criterion (least learning machine) of TSK fuzzy classifier is adopted. When $\beta$ is a larger number, the soft label information dominates the optimization of the consequent parameter, and other parts are negligible.

The Lagrangian optimization formula of the objective function can be expressed as:

$$L(P, \varsigma, \xi, \tau, \upsilon) = \qquad (21)$$
$$\frac{1}{2}\|\varsigma\|_2^2 + \frac{\alpha}{2}\|P\|_2^2 + \frac{\beta}{2}\|\xi\|_2^2 - \tau\left(\tilde{Q}P - \tilde{Y} - \varsigma\right) - \upsilon\left(\tilde{Q}P - \tilde{S} - \xi\right)$$

where, $\varsigma=(\varsigma_1, \varsigma_2, \ldots, \varsigma_N)^T$, $\xi=(\xi_1, \xi_2, \ldots, \xi_N)^T$, $\tau=(\tau_1, \tau_2, \ldots, \tau_N)^T$ and $\upsilon=(\upsilon_1, \upsilon_2, \ldots, \upsilon_N)^T$ are Lagrangian multipliers with equality constraints, and an input matrix is denoted by $\tilde{Q}=(Q_1, Q_2, \ldots, Q_N)^T$.

The consequent parameter P is calculated by setting a derivative gradient of the Lagrangian optimization formula with respect to (P, $\varsigma$, $\xi$, $\tau$, $\upsilon$) equal to be zero, resulting in following KKT optimality conditions:

$$\begin{cases} \dfrac{\partial L}{\partial P} \Rightarrow \alpha P^T = \tau \tilde{Q} + \upsilon \tilde{Q} \\[4pt] \dfrac{\partial L}{\partial \varsigma} \Rightarrow \varsigma^T + \tau = 0 \\[4pt] \dfrac{\partial L}{\partial \xi} \Rightarrow \beta \xi^T + \upsilon = 0 \\[4pt] \dfrac{\partial L}{\partial \tau} \Rightarrow \tilde{Q}P - \tilde{Y} - \varsigma = 0 \\[4pt] \dfrac{\partial L}{\partial \upsilon} \Rightarrow \tilde{Q}P - \tilde{S} - \xi = 0 \end{cases} \qquad (22)$$

and yielding:

$$\begin{cases} \tau = -\left(\tilde{Q}P - \tilde{Y}\right)^T \\[4pt] \upsilon = -\beta\left(\tilde{Q}P - \tilde{S}\right)^T \\[4pt] \alpha P^T = -\left(\tilde{Q}P - \tilde{Y}\right)^T \tilde{Q} - \beta\left(\tilde{Q}P - \tilde{S}\right)^T \tilde{Q} \end{cases} \qquad (23)$$

therefore, the optimal analytical solution can be expressed as:

$$P = \left(\alpha I + (1+\beta)\tilde{Q}^T\tilde{Q}\right)^{-1}\left(\tilde{Q}^T\tilde{Y} + \beta\tilde{Q}^T\tilde{S}\right) \tag{24}$$

where, I is an identity matrix.

In order to improve the generalization ability, two methods of regularization term and knowledge distillation are adopted. The consequent parameter $P^T$ is not only subject to L2 regularization term $\|P\|^2$, but also uses the knowledge distillation term to avoid over-fitting.

3. CNNBaTSK Algorithm Flow

The entire learning algorithm of the CNNBaTSK is described as the following algorithm 1:

---

Algorithm 1: CNNBaTSK learning algorithm

---

Input: training dataset $X = \{x_i, x_i = (x_1, x_2, ..., x_n)^T, x_i \in R^n, i = 1, 2, ..., N\}$ and
$\tilde{Y} = \{Y_i, Y_i \in \{0, 1, ..., K\}, i = 1, 2, ..., N\}$, and a maximum iteration epoch $\breve{I}$, initial learning rate $\theta$,
the number of fuzzy rules M, distillation temperature T, regularization factors $\alpha$ and $\beta$, and testing
sample $x_{test}$ of the convolutional neural network;
Output: CNNBaTSK after completion of training, and the output $\tilde{y}_{test}$ of testing sample;
Training procedure:
Initialization: initializing $W_t$ and $b_t$ with random numbers,
For $1 < \breve{I}$ :
Step1: inputting training samples $X = \{x_i, x_i = (x_1, x_2, ..., x_n)^T, x_i \in R^n, i = 1, 2, ..., N\}$, and
performing a convolutional and pooling operation on the training samples through the Conv layer
and the Pool layer to extract depth features;
Step2: calculating a probability that the sample belongs to each label at the FC layer;
Step3: performing error backpropagation on 1D-CNN according to the cross-entropy loss
function formula;
End
Step4: generating a probability distribution $E_i = (e_1, e_2)^T$ of the output layer;
Step5: introducing the distillation temperature T and converting it into the soft label information
$S = \{s_i = (s_1, s_2)^T, s_k \in [0, 1], k = 1, 2, i = 1, 2, ..., N\}$ ;
Step6: partitioning the antecedent part into five fixed fuzzy partitions, where the center of each
fuzzy partition is $c_d^m \in \{0, 0.25, 0.5, 0.75, 1\}$, and the kernel width $\sigma_d^m$ is set at a random
positive value which is between 0 and 1;
Step7: computing a normalized membership $\tilde{\mu}^m(s_i)$ of the training sample in different rules;
Step8: computing and generating $Q_i$, where the output of the CNNBaTSK can be expressed as
  $\tilde{y}_i = Q_i^T P$ ;
Step9: computing an analytical solution for P to be: $P = (\alpha I + (1+\beta)\tilde{Q}^T\tilde{Q})^{-1}(\tilde{Q}^T\tilde{Y} + \beta\tilde{Q}^T\tilde{S})$ ;
Testing procedure:
Step1: inputting a testing sample $x_{test}$;
Step2: generating the probability distribution $E_{test} = (e_1, e_2)^T$ of the output layer;
Step3: computing the probability distribution $s_{test} = (s_1, s_2)^T$ of the output layer of the soft
label information;
Step4: computing a normalized membership $\tilde{\mu}^m(s_i)$ of the testing sample in different rules;
Step5: outputting $\tilde{y}_{test}$ of the testing sample according to $\tilde{y}_{test} = Q_{test}^T P$ .

---

4. Time Complexity Analysis

The time complexity of the CNNBaTSK algorithm is analyzed. The computational complexity of the convolutional design network in the CNNBaTSK is approximately $$O(\theta(\sum_{l=1}^{L} C_{l-1} \cdot w_l \cdot C_l \cdot \chi_l)),$$

where $\tilde{\theta}$ represents the maximum iteration epoch of the convolutional design network, and $C_l$, $w_l$, and $\chi_i$ represent the number of feature maps, the size of convolution kernel, and the dimension of feature map in layer l, respectively. A fixed partition method is then employed to generate fuzzy membership, where the time complexity is negligible. The LLM-KD algorithm is used to learn the consequent parameters of the fuzzy rules. That is, the time complexity required by LLM-KD is $O(Nn^2+n^3)$, and the total training time complexity of the CNNBaTSK is $$O(I_{max}(\sum_{t=1}^{i} C_{t-1} \cdot w_t \cdot C_t \chi_t) + Nn^2 + n^3).$$

5. Experiments and Analysis

This section presents experimental results on the UCI (University of California, Irvine) and KEEL (Knowledge Extraction based on Evolutionary Learning) benchmark datasets and the CHB-MIT datasets to demonstrate the effectiveness of the CNNBaTSK algorithm. The experimental environment includes: AMD Ryzen 5 3600 at 3.6 GHz and 32G RAM, GeForce RTX 2070 SUPER with 8G RAM, and the 64-bit Microsoft Windows 10; and the programming environment includes: Python 3.5.2 with torch 1.2.0.

5.1 Datasets

In this experiment, 9 widely used datasets are selected from UCI or KEEL repositories to evaluate the CNNBaTSK, and the datasets are shown in Table 1. In addition, this study selects part of the CHB-MIT datasets for performance verification, and only the FT10-T8 channels are used for epilepsy recognition. For each group, a 2-second sliding window is used to crop the scalp EEG recording, and a fast Fourier transform algorithm is employed to calculate the relevant frequency-domain features of respective time-domain EEG signals; and the sampling interval is set to 0.5 Hz. The details of the datasets are shown in Table 2.

TABLE 1

| Benchmark datasets | | | | |
|---|---|---|---|---|
| Index | Dataset | Samples | Features | Classes |
| 1 | waveform2 | 3304 | 21 | 2 |
| 2 | biodeg | 1055 | 41 | 2 |

TABLE 1-continued

| | Benchmark datasets | | | |
|---|---|---|---|---|
| Index | Dataset | Samples | Features | Classes |
| 3 | magic | 19020 | 10 | 2 |
| 4 | wdbc | 569 | 30 | 2 |
| 5 | ring | 7500 | 20 | 2 |
| 6 | spambase | 4597 | 57 | 2 |
| 7 | electrical | 10000 | 12 | 2 |
| 8 | wisconsin | 683 | 9 | 2 |
| 9 | twonorm | 7400 | 20 | 2 |

TABLE 2

| | CHB-MIT datasets | | | |
|---|---|---|---|---|
| Index | Patient | Samples | Features | Classes |
| 1 | chb01 | 2681 | 53 | 2 |
| 2 | chb02 | 1041 | 53 | 2 |
| 3 | chb03 | 2401 | 53 | 2 |
| 4 | chb05 | 3413 | 53 | 2 |
| 5 | chb07 | 1947 | 53 | 2 |
| 6 | chb10 | 2691 | 53 | 2 |

5.2 Experimental Organization

Generally, the CNNBaTSK has a two-stage training process, that is, training a well-trained convolutional neural network and training a born-again TSK fuzzy classifier. Therefore, the neural network architecture for different datasets is searched, and comparison experiments are conducted under different experimental settings, such as learning rate and iteration epoch, to obtain a well-trained CNN model and exact suitable soft label information. In general, the learning rate $\theta$ is 0.01 and the maximum iteration epoch $\bar{l}$ is 100. The parameter of the distillation temperature T is selected from $\{1, 5, 10, 20, 100\}$ so as to provide a suitable soft label information. Furthermore, the regularization factor $\alpha$ of the LLM-KD is searched from $\{0, 0.01, 0.1, 1, 10, 100, 1000, 10000\}$, the distillation parameter $\beta$ is searched from $\{0, 0.01, 0.1, 1, 10, 100, 1000, 10000\}$, and other parameters adopt default values.

In the experiment, the method proposed by this application is compared with the original CNN model and several classical classifiers. Details of the method employed are as follows:

1) Decision Tree (DT), Partial Decision Tree Classifier (PART), RIPPER Classifier (JRip) and DecisionTable and Naive Bayesian Classifier (NB) are used as benchmark models, all parameters are set by the default values, and all models are achieved in the Weka tool box.

2) Compared with two classic fuzzy classifiers: the TSK fuzzy classifier (FCM-TSK-FC) based on FCM (fuzzy C-means) and the TSK fuzzy classifier (FCM-PCA-TSK-FC) based on FCM and principal component analysis. It should be noted that the antecedent part of these classifiers all adopts the FCM algorithms to perform fuzzy partitioning on the feature space. For the FCM algorithms, the clustering scale factor is searched from $\{2^{-4}, 2^{-3}, 2^{-2}, 2^{-1}, 1, 2, 2^2, 2^3, 2^4\}$, the number of fuzzy rules is searched from 5 to 32 with an interval of 3; the consequent part is optimized by traditional LLM, where the regularization factor $\alpha$ is searched from $\{0, 0.01, 0.1, 1, 10, 100, 1000, 10000\}$.

In terms of performance indicators, classification evaluation are performed using Accuracy and F-Measure.

$$\text{Accuracy} = (TP + TN)/(TP + FP + FN + TN) \qquad (25)$$

$$P = TP/(TP + FP) \qquad (26)$$

$$R = TP/(TP + FN) \qquad (27)$$

$$F - \text{Measure} = (2 \times P \times R)/(P + R) \qquad (28)$$

where, Accuracy is the most intuitive performance measure, reporting a ratio of correctly predicted sample to the total sample. F-Measure is a weighted average of precision and recall, that is, it considers both false positives and false negatives. Classifiers are evaluated on each dataset using a five-fold cross-validation strategy. The average Accuracy and F1-Measure are reported in the experimental results. Since the runtime environment of Weka Toolbox is Java rather than Python, no running time is reported in the experimental results.

5.3 Experimental Results

The average testing Accuracy and F1-Measure of nine comparative classifiers on these nine benchmark datasets are given in Tables 3 and 4, respectively. Meanwhile, Tables 5 and 6 report the average testing Accuracy and F1-Measure of the nine comparative classifiers on the CHB-MIT datasets. The best performance for each dataset is marked in bold.

TABLE 3

Accuracy classification performance of the nine classifiers on the benchmark datasets

| Dataset | DT | NB | DecisionTable | PART | Jrip | PCA-FCM-TSK-FC | FCM-TSK-FC | CNN | CNNBaTSK |
|---|---|---|---|---|---|---|---|---|---|
| waveform2 | 0.8598 | 0.8795 | 0.8689 | 0.8783 | 0.8816 | 0.8293 | 0.8384 | 0.8599 | 0.9297 |
| biodeg | 0.8433 | 0.7659 | 0.8038 | 0.84 | 0.8095 | 0.8662 | 0.892 | 0.8493 | 0.8984 |
| magic | 0.8148 | 0.7271 | 0.8253 | 0.8523 | 0.8453 | 0.8797 | 0.8918 | 0.8100 | 0.8356 |
| wdbc | 0.9542 | 0.9139 | 0.9069 | 0.9455 | 0.9227 | 0.9240 | 0.9355 | 0.9737 | 0.9841 |
| ring | 0.957 | 0.9793 | 0.768 | 0.9357 | 0.9212 | 0.8695 | 0.841 | 0.9562 | 0.9665 |
| spambase | 0.9071 | 0.7973 | 0.8788 | 0.9421 | 0.9124 | 0.8746 | 0.9054 | 0.9038 | 0.9345 |
| electrical | 0.8629 | 0.8316 | 0.7708 | 0.8634 | 0.8716 | 0.8224 | 0.8718 | 0.8633 | 0.8813 |
| wisconsin | 0.9633 | 0.9634 | 0.959 | 0.9473 | 0.9473 | 0.9460 | 0.9473 | 0.9722 | 0.9765 |
| twonorm | 0.969 | 0.9788 | 0.7814 | 0.9158 | 0.9059 | 0.9284 | 0.9390 | 0.9727 | 0.9789 |
| Average | 0.9035 | 0.8708 | 0.8403 | 0.9023 | 0.8908 | 0.8822 | 0.8958 | 0.9068 | 0.9317 |

TABLE 4

F-measure classification performance of the nine classifiers on the benchmark datasets

| Dataset | DT | NB | DecisionTable | PART | Jrip | PCA-FCM-TSK-FC | FCM-TSK-FC | CNN | CNNBaTSK |
|---|---|---|---|---|---|---|---|---|---|
| waveform2 | 0.8598 | 0.8797 | 0.8689 | 0.8783 | 0.8816 | 0.8324 | 0.8412 | 0.879 | 0.9297 |
| biodeg | 0.8433 | 0.7674 | 0.8064 | 0.8432 | 0.8162 | 0.8645 | 0.8914 | 0.8498 | 0.8979 |
| magic | 0.809 | 0.7548 | 0.8307 | 0.8565 | 0.8498 | 0.8776 | 0.8901 | 0.8169 | 0.8302 |
| wdbc | 0.9541 | 0.9146 | 0.9075 | 0.9457 | 0.9231 | 0.9237 | 0.9350 | 0.9738 | 0.9840 |
| ring | 0.957 | 0.9793 | 0.7687 | 0.9357 | 0.9212 | 0.8681 | 0.8402 | 0.9562 | 0.9665 |
| spambase | 0.9071 | 0.7974 | 0.8795 | 0.9423 | 0.9124 | 0.8719 | 0.9044 | 0.904 | 0.9344 |
| electrical | 0.8647 | 0.8363 | 0.7794 | 0.8655 | 0.8732 | 0.8145 | 0.8708 | 0.8648 | 0.8812 |
| wisconsin | 0.9633 | 0.9635 | 0.9592 | 0.9476 | 0.9476 | 0.946 | 0.9473 | 0.972 | 0.9768 |
| twonorm | 0.969 | 0.9788 | 0.7814 | 0.9158 | 0.9059 | 0.9278 | 0.9386 | 0.9727 | 0.9789 |
| Average | 0.903 | 0.8746 | 0.8424 | 0.9034 | 0.8923 | 0.8807 | 0.8954 | 0.9099 | 0.9311 |

TABLE 5

Accuracy classification performance of the nine classifiers on the CHB-MIT datasets

| Dataset | DT | NB | DecisionTable | PART | Jrip | PCA-FCM-TSK-FC | FCM-TSK-FC | CNN | CNNBaTSK |
|---|---|---|---|---|---|---|---|---|---|
| chb01 | 0.9377 | 0.962 | 0.9161 | 0.953 | 0.9463 | 0.9713 | 0.9705 | 0.9657 | 0.9765 |
| chb02 | 0.8714 | 0.9212 | 0.8713 | 0.8963 | 0.9087 | 0.9385 | 0.9501 | 0.931 | 0.9769 |
| chb03 | 0.9346 | 0.9525 | 0.9325 | 0.9434 | 0.9463 | 0.9654 | 0.9662 | 0.9588 | 0.9787 |
| chb05 | 0.9525 | 0.9634 | 0.9487 | 0.9596 | 0.9596 | 0.9725 | 0.9757 | 0.9769 | 0.9845 |
| chb07 | 0.9245 | 0.9507 | 0.9199 | 0.9414 | 0.9312 | 0.9605 | 0.9579 | 0.9538 | 0.9655 |
| chb10 | 0.9342 | 0.8755 | 0.9056 | 0.9372 | 0.9391 | 0.9628 | 0.9573 | 0.9599 | 0.9699 |
| Average | 0.9258 | 0.9376 | 0.9157 | 0.9385 | 0.9385 | 0.9618 | 0.963 | 0.9577 | 0.9753 |

TABLE 6

F-measure classification performance of the nine classifiers on the CHB-MIT datasets

| Dataset | DT | NB | DecisionTable | PART | Jrip | PCA-FCM-TSK-FC | FCM-TSK-FC | CNN | CNNBaTSK |
|---|---|---|---|---|---|---|---|---|---|
| chb01 | 0.9383 | 0.9621 | 0.9173 | 0.9633 | 0.9467 | 0.9712 | 0.9706 | 0.9658 | 0.9765 |
| chb02 | 0.8741 | 0.922 | 0.8739 | 0.8978 | 0.9099 | 0.9385 | 0.9502 | 0.9304 | 0.9768 |
| chb03 | 0.9352 | 0.9528 | 0.9332 | 0.9438 | 0.9466 | 0.9655 | 0.9664 | 0.9585 | 0.9788 |
| chb05 | 0.9529 | 0.9636 | 0.9492 | 0.9598 | 0.9598 | 0.9723 | 0.9756 | 0.977 | 0.9845 |
| chb07 | 0.9253 | 0.951 | 0.9208 | 0.9419 | 0.9318 | 0.9604 | 0.9579 | 0.954 | 0.9653 |
| chb10 | 0.9348 | 0.8788 | 0.9067 | 0.9377 | 0.9396 | 0.9628 | 0.9573 | 0.96 | 0.9697 |
| Average | 0.9268 | 0.9384 | 0.9169 | 0.9407 | 0.9391 | 0.9618 | 0.963 | 0.9576 | 0.9753 |

The following conclusions can be drawn from the above four tables.

1) Compared with other classifiers, the CNNBaTSK classifier proposed by this application has the best average performance in terms of the Accuracy and the F-Measure. More specifically, the CNNBaTSK achieves the best Accuracy and/or the best M-measure in six out of the nine benchmark datasets. The CNNBaTSK also maintains a comparable performance on magic, ring, and spambase datasets, while FCM-TSK-FC wins the best performance in terms of Accuracy and F-Measure on the magic dataset, and NB and PART achieve the best performance in terms of Accuracy and F-Measure on the ring and spambase datasets. Furthermore, the CNNBaTSK achieves the best performance in terms of Accuracy and M-measure for all groups on the CHB-MIT dataset.

2) Evidently, the CNNBaTSK performs better than CNN on all the 9 datasets, and the CNN ranks second in terms of Accuracy and/or F-Measure. The reason for its existence is that the CNNBaTSK combines fuzzy representation ability and knowledge distillation strategy, and improves the generalization ability of models and avoids over-fitting through the LLM-KD algorithm. Moreover, with an advantage from the deep learning methods, the CNNBaTSK inherits the benchmark results of CNNs on the nine datasets and achieves the best performance among the adopted classifiers. It can be concluded that training the proposed fuzzy rules with the LLM-KD can improve the classification performance.

Figure 2:
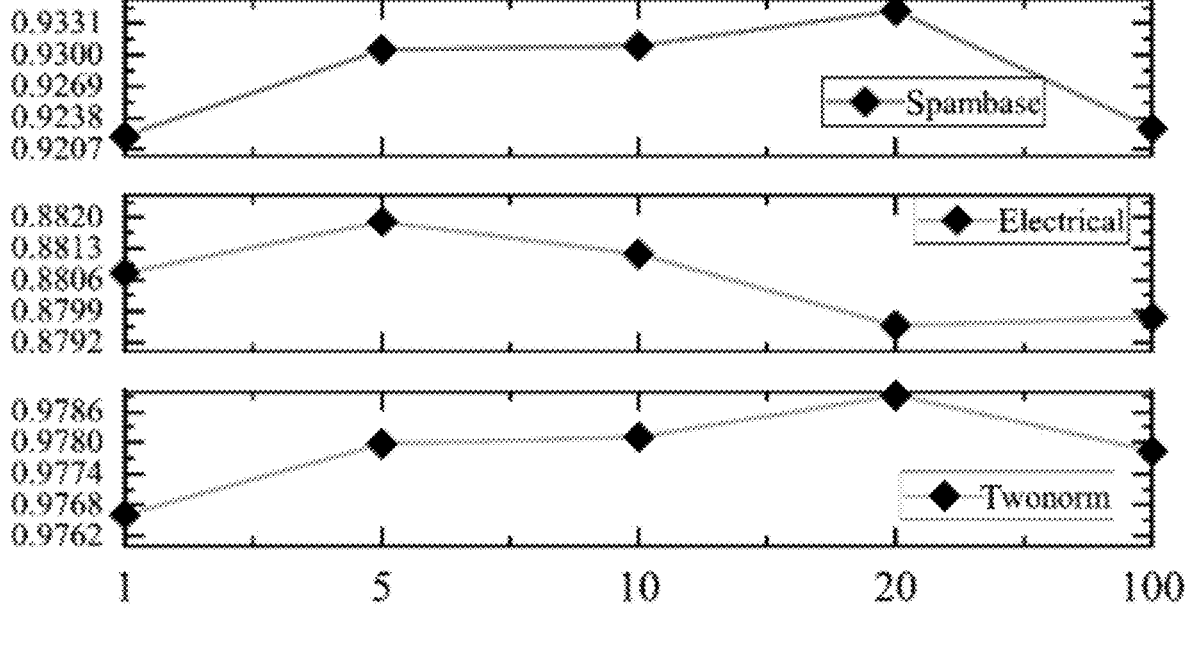
FIG. 2 is a schematic diagram of the effects of a distillation temperature on the CNNBaTSK.

Since the output of the softmax function on the CNN has a correct label at a considerably high probability, all other label probabilities are considerably close to zero. Therefore, it does not provide more additional information beyond the ground-truth label already provided in the training samples. The distillation temperature T has an important influence on the softness of the label. In order to analyze the influences of the knowledge distillation temperature, for three randomly selected data sets, FIG. 2 reports the Accuracy performance changes at different distillation temperatures on spambase, electrical and twonorm datasets, where other parameters are set to the optimal parameters. It can be seen from the figures that the curves show a trend in which the performance firstly increases and then decreases. It can be concluded that a value that is set significantly high is more likely to cause the loss of vital information. For these three representative datasets, a distillation temperature T within $\{5, 20\}$ may be a better option.

Figure 3:
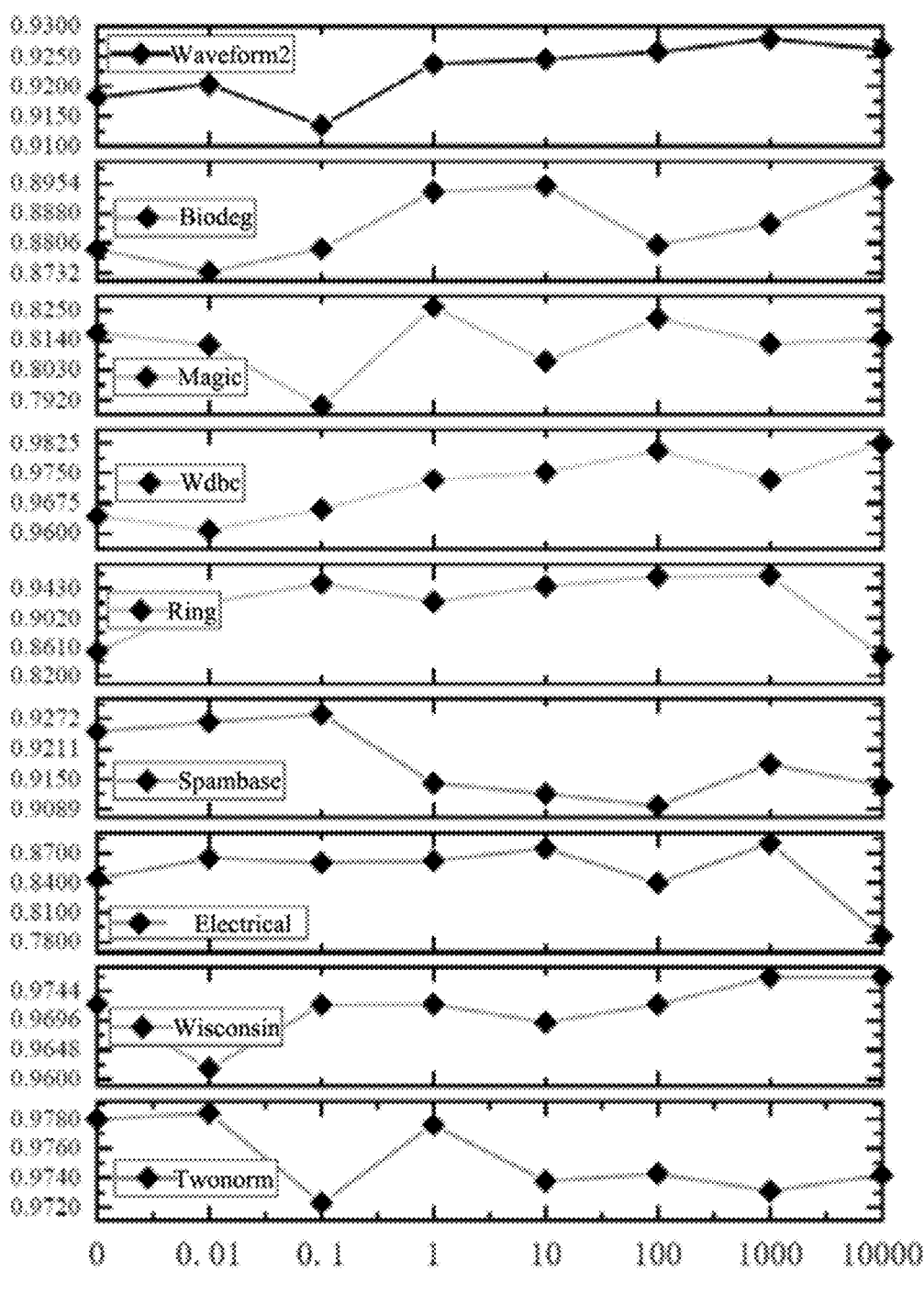
FIG. 3 is a schematic diagram of the effects of a knowledge distillation on the CNNBaTSK.

The parameters $\alpha$ and $\beta$ have a significant impact on the training of the consequent parameters in the CNNBaTSK. In order to verify the effect of the knowledge distillation part, FIG. 3 reports the effects of the distillation parameter $\beta$ on the performance in the benchmark datasets, where the parameter $\beta$ is selected from $\{0, 0.01, 0.1, 1, 10, 100, 1000, 10000\}$, and the optimal parameters of the regularization factor $\alpha$ are selected in each dataset. To sum up, on the waveform 2, biodge, wdbc and wisconsin datasets, the classification performance improves significantly as the distillation parameters increase. But on the magic, ring, spambase, electrical and twonorm datasets, an appropriate distillation parameter $\beta$ can improve the classification performance; however, a distillation parameter $\beta$ when at a high value may cause the performance degradation. The above analysis shows that the knowledge distillation can effectively improve the classification performance, and setting the distillation parameter to 1 is a good option for the CNNBaTSK proposed by this application.

Figure 4:
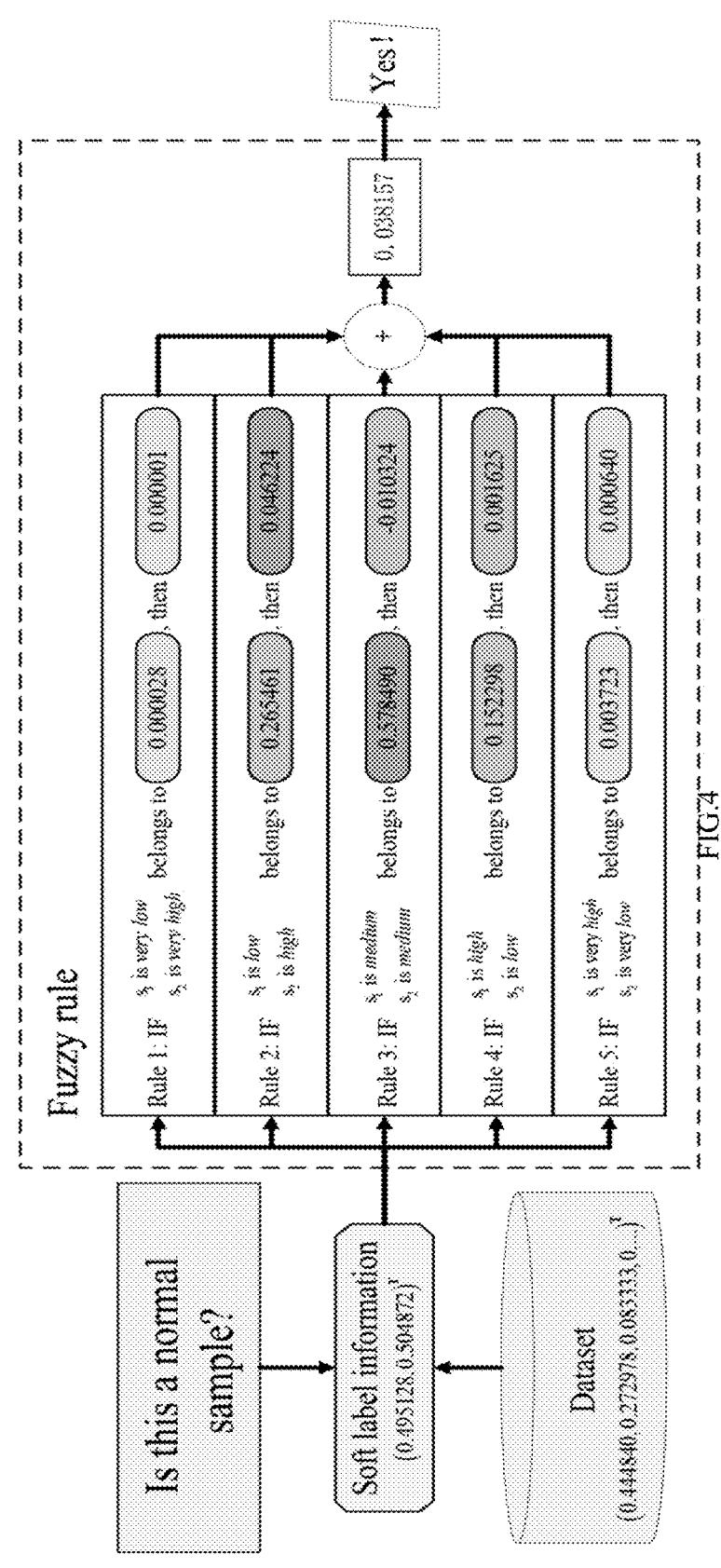
FIG. 4 is a schematic diagram of an example of the CNNBaTSK generating fuzzy rules.

Finally, interpretability analysis of the CNNBaTSK is performed on the biodge dataset. Table 7 shows the fuzzy rule parameters of the CNNBaTSK on the biodge dataset. The clustering center of each rule takes five different fuzzy partitions, and each soft label information corresponds to a fuzzy linguistic description, such as $s_1$ being very low, and $s_2$ being very high. FIG. 4 further shows a sample to reflect the degree of membership of each rule. It can be seen that Rule 3 is more important in decision-making process, Rules 2 and 4 play a relatively minor roles despite of relatively high output values, and Rules 1 and 5 do not work on the whole model. Furthermore, although the fuzzy rules obtained by the CNNBaTSK are interpretable, the manner in which the CNN makes the decision remains unknown. Thus, it is worthwhile to further improve the interpretability by combining the CNNBaTSK with other interpretable methods.

features with soft label information, which helps to process dark knowledge output by the convolutional neural network in an interpretable manner. Experiments on benchmark datasets and CHB-MIT datasets show that CNNBaTSK can improve classification performance and provide certain interpretability.

The above-mentioned examples are an illustration for this application, not a limitation to this application, and any solution after a simple transformation of this application falls within the protection scope of this application.

What is claimed is:

1. A born-again TSK fuzzy classifier based on knowledge distillation, wherein the born-again TSK fuzzy classifier based on knowledge distillation is denoted as CNNBaTSK, and a fuzzy rule of the CNNBaTSK comprises two parts: an antecedent part based on soft label information and a consequent part based on original data, and a method for constructing the fuzzy rule of the CNNBaTSK comprises following steps:

Step 1: taking, by the CNNBaTSK, the original data as input, obtaining a probability distribution of an output layer through a layer-by-layer neural expression, and introducing a distillation temperature to generate soft label information of DATASET;

Step 2: partitioning the soft label information into five fixed fuzzy partitions to construct the fuzzy rule in a fuzzy part of the CNNBaTSK;

Step 3: introducing the original data to calculate a consequent parameter, and optimizing the consequent parameter of CNNBaTSK using a non-iterative learning method.

2. The born-again TSK fuzzy classifier based on knowledge distillation according to claim 1, wherein in Step 2, each soft label information in different fuzzy rules have a center of $\{0, 0.25, 0.5, 0.75, \text{and } 1\}$ respectively, and the soft label information is transformed into semantic interpretation to construct the fuzzy rule.

3. The born-again TSK fuzzy classifier based on knowledge distillation according to claim 1, wherein in Step 1, a specific method of generating the soft label information of DATASET comprises: firstly stacking multiple convolutional layers and pooling layers, in terms of layer by layer learning and generating a depth feature, the convolutional layers and the pooling layers used being disposed alternately, and then performing classification through several

TABLE 7

Fuzzy rule parameters of the CNNBaTSK on biodeg dataset

| Rule | Antecedent - consequent part | Parameters |
|---|---|---|
| Rule 1 | Antecedent part | $c^1 = (0, 1)^T, \sigma^1 = (0.015986, 0.054122)^T$ |
|  | Consequent part | $p^1 = (-0.000780, 0.083930, \ldots, 0.035692)^T$ |
| Rule 2 | Antecedent part | $c^2 = (0.25, 0.75)^T, \sigma^2 = (0.096906, 0.063925)^T$ |
|  | Consequent part | $p^2 = (0.001707, 0.009323, \ldots, 0.001507)^T$ |
| Rule 3 | Antecedent part | $c^3 = (0.5, 0.5)^T, \sigma^3 = (0.015157, 0.042397)^T$ |
|  | Consequent part | $p^3 = (-0.006005, 0.000380, \ldots, 0.000000)^T$ |
| Rule 4 | Antecedent part | $c^4 = (0.75, 0.25)^T, \sigma^4 = (0.033904, 0.086006)^T$ |
|  | Consequent part | $p^4 = (0.003693, 0.010500, \ldots, -0.049312)^T$ |
| Rule 5 | Antecedent part | $c^5 = (1, 0)^T, \sigma^5 = (0.035146, 0.089706)^T$ |
|  | Consequent part | $p^5 = (-0.006623, -0.011890, \ldots, 0.011586)^T$ |

This application provides a novel perspective of knowledge distillation with the LLM-KD, without a complete retraining of the entire model, where only the fuzzy rules are required to be retrained. The CNNBaTSK maintains the interpretability of model due to using fuzzy rules. The fuzzy rules have a semantic interpretation of replacing the original fully-connected layers and the output layer; the convolutional layer, the pooling layer, and the fully-connected layer are respectively denoted as a Conv layer, a Pool layer, and a FC layer;

assuming that a training dataset is $X=\{x_i, x_i=(x_1, x_2, \ldots, x_n)^T, x_i \in R^n, i=1, 2, \ldots, N\}$ and a label set is $\check{Y}=\{Y_i, Y_i \in \{0, 1, \ldots, K\}, i=1, 2, \ldots, N\}$, where n represents a sample dimension, N represents a sample quantity, and K represents a sample category; in a convolutional neural network, an output result (feature map) of a layer t is marked as $Z_t$, where $Z_0$ represents the original data $x_i$;

in the Conv layer, a local connection method is employed to execute a convolution calculation, and then a bias be is added to the feature map, and then an activation function $f(\bullet)$ is employed for a nonlinear transformation; and a calculation process for the Conv layer is as follows:

$$Z_t = j(W_i * Z_{t-1} + b_t) \tag{1}$$

after the convolution calculation is completed, a nonlinear mapping of the PRelu activation function is performed, wherein a mathematical expression of the PRelu is expressed as follows:

$$f(a) = \begin{cases} a, \text{ if } a > 0 \\ \kappa a, \text{ otherwise} \end{cases} \tag{2}$$

wherein $\alpha$ represents an input variable and $\kappa$ represents a slope coefficient;

in the Pool layer, a maximum value in a pooling window is selected as a result in a selected maximum pooling operation, and a pooling process can be expressed as follows:

$$Z_t = \text{Pool}(Z_{t-1}) \tag{3}$$

after several convolution and maximum pooling operations, an extracted depth feature is input into a first FC layer; in the FC layer, all neurons between layers are connected, and the depth feature is further mapped to a new feature space to complete a classification task; calculation is performed through a weight $W_t$ and the bias $b_t$, and a nonlinear transformation is performed using the activation function $f(\bullet)$; and a calculation process is as follows:

$$Z_t = f(W_t \cdot Z_{t-1} + b_t) \tag{4}$$

an output layer of the convolutional neural network uses Softmax activation function, and an output thereof $Z_t = (z_1, z_2, \ldots, z_K)^T$ is transformed into a corresponding probability result $E_i = (e_1, e_2, \ldots, e_K)^T$, wherein K represents a total number of category, and its calculation process is as follows:

$$e_K = \exp(z_K)/\sum_{k=1}^{K} \exp(z_k) \tag{5}$$

during the training process, a cross-entropy loss function is employed to measure a difference between the output of the convolutional neural network and a ground-truth label, and its calculation formula is as follows:

$$\min - \frac{1}{N}\sum_{i=1}^{N}\sum_{k=1}^{K} Y_{i,k}\log(e_k^{(E_i)}) \tag{6}$$

the weight $W_t$ and bias $b_t$ of the convolutional neural network are iterated and optimized through an error backpropagation algorithm; a loss value of formula (6) is backpropagated from a last layer to a first layer, and parameter updating is performed according to the error of each layer; assuming that a derivative of cross-entropy loss for the weight $W_t$ is $\Delta W_t$, and a derivative of cross-entropy loss for the bias $b_t$ is $\Delta b_t$, formula for parameter updating are expressed as follows:

$$W_t^l = W_t^l - \theta\Delta W_t^{l-1} \tag{7}$$

$$b_t^l = b_t^l - \theta\Delta b_t^{l-1} \tag{8}$$

wherein l represents a training iteration epoch and $\theta$ represents a learning rate;

in order to facilitate the distinction, a probability distribution of the output layer softened by the distillation temperature T is called the soft label information $s_i = (s_1, s_2, \ldots, s_K)^T$, and its calculation method is as follows:

$$s_K = \exp(z_K/T)/\sum_{k=1}^{K}\exp(z_k/T) \tag{9}$$

in a binary-class classification task, assuming that the training dataset is expressed as $X=\{x_i, x_i=(x_1, x_2, \ldots, x_n)^T, x_i \in R^n, i=1, 2, \ldots, N\}$, $\check{Y}=\{Y_i, Y_i, \in \{0,1\}, i=1, 2, \ldots, N\}$ is a ground-truth label vector of the binary-class classification task; the probability distribution of the output layer $E_i = (e_1, e_2)^T$ is transformed into the soft label information $S=\{s_i=(s_1, s_2)^T, s_k \in [0,1], k=1,2, i=1, 2, \ldots, N\}$ after introducing the distillation temperature T, wherein the sum of all probabilities in each sample is 1, that is, $s_1 + s_2 = 1$.

4. The born-again TSK fuzzy classifier based on knowledge distillation according to claim 3, wherein in Step 2, the CNNBaTSK adopts following fuzzy rules:

In rule m: IF $s_1$ is $*^\wedge s_2$ is $*$ THEN $y^m =$ (10)

$$p_0^m + p_1^m x_1 + p_2^m x_2 + \ldots + p_n^m x_n. \ m = 1, 2, \ldots, M$$

wherein $*$ denotes the membership of fuzzy partition, M is the total number of fuzzy rules and $\wedge$ denotes a fuzzy conjunction operator, and the consequent part adopts a linear function of the input data $x_i$;

the antecedent part of the soft label information is taken into five fixed fuzzy partitions, wherein each fuzzy partition has a center of $$c_d^m \in \{0, 0.25, 0.5, 0.75, 1\},$$

and the kernel width $$\sigma_d^m$$

is set at a random positive value which is between 0 and 1; then, a Gaussian membership function as a fuzzy membership function is applied to estimate a membership of each rule, and its calculation method is as follows:

$$\mu_m(s_{i,d}) = \exp\left(-(s_{i,d} - c_d^m)^2/2\sigma_d^m\right) \tag{11}$$

$$\mu_m(s_i) = \prod_{d=1}^{2} \mu_m(s_{i,d}) \; \mu_m(s_i) = \prod_{d=1}^{2} \mu_m(s_{i,d}) \tag{12}$$

a normalized membership function is formulated as follows:

$$\tilde{\mu}_m(s_i) = \mu_m(s_i)/\sum_{m'=1}^{M} \mu_{m'}(s_i) \tag{13}$$

therefore, the output $\tilde{y}_i$ of the CNNBaTSK can be expressed as:

$$\tilde{y}_i = \sum_{m=1}^{M} \tilde{\mu}_m(s_i)y^m \tag{14}$$

making:

$$p^m = (p_0^m, p_1^m, \dots, p_n^m)^T \tag{15}$$

$$P = \left((p^i)^T, (p^2)^T, \dots, (p^m)^T\right)^T \tag{16}$$

$$q_i^m = \tilde{\mu}_m(s_i)(l, x_i)^T \tag{17}$$

$$Q_i = \left((q_i^i)^T, (q_i^2)^T, \dots, (q_i^m)^T\right)^T \tag{18}$$

the output $\tilde{y}_i$ of the CNNBaTSK may be expressed as:

$$\tilde{y}_i = Q_i^T P. \tag{19}$$

5. The born-again TSK fuzzy classifier based on knowledge distillation according to claim 4, wherein in Step 3, a specific method for optimizing the consequent parameter of the CNNBaTSK is as follows:

an objective function is designed to balance the ground-truth label and the soft label information, and a following objective function for optimization is proposed:

$$\min \frac{1}{2}\sum_{i=1}^{N} \varsigma_i^2 + \frac{\alpha}{2}\|P\|_2^2 + \frac{\beta}{2}\sum_{i=1}^{N}\xi_i^2 \tag{20}$$

$$\text{s.t.}\begin{cases} Q_i^T P - Y_i = \varsigma_i \\ Q_i^T P - s_{i,2} = \xi_i \end{cases}, i = 1, 2, \dots, N$$

wherein P is the consequent parameter of the fuzzy rule, $\alpha$ and $\beta$ are regularization factors, $\varsigma_i$ is a deviation between the prediction output and the ground-truth label, $\xi_i$ is a deviation between the prediction output and the soft label information; based on $s_1+s_2=1$ and the ground-truth label, index of the probability $s_2$ is matched with the ground-truth label;

a Lagrangian optimization formula of the objective function can be expressed as:

$$L(P, \varsigma, \xi, \tau, \nu) = \frac{1}{2}\|\varsigma\|_2^2 + \frac{\alpha}{2}\|P\|_2^2 + \frac{\beta}{2}\|\xi\|_2^2 - \tau(\tilde{Q}P - \tilde{Y} - \varsigma) - \nu(\tilde{Q}P - \tilde{S} - \xi) \tag{21}$$

wherein $\zeta=(\zeta_1, \zeta_2, \dots, \zeta_N)^T$, $\xi=(\xi_1, \xi_2, \dots, \xi_N)^T$, $\tau=(\tau_1, \tau_2, \dots, \tau_N)^T$ and $\nu=(\nu_1, \nu_2, \dots, \nu_N)^T$ are Lagrangian multipliers with equality constraints, and an input matrix is denoted by $\tilde{Q}=(Q_1, Q_2, \dots, Q_N)^T$;

the consequent parameter P is calculated by setting a derivative gradient of the Lagrangian optimization formula with respect to (P, $\zeta$, $\xi$, $\tau$, $\nu$) equal to be zero, resulting in following KKT optimality conditions:

$$\begin{cases} \frac{\partial L}{\partial P} \Rightarrow \alpha P^T = \tau\tilde{Q} + \nu\tilde{Q} \\ \frac{\partial L}{\partial \varsigma} \Rightarrow \varsigma^T + \tau = 0 \\ \frac{\partial L}{\partial \xi} \Rightarrow \beta\xi^T + \nu = 0 \\ \frac{\partial L}{\partial \tau} \Rightarrow \tilde{Q}P - \tilde{Y} - \varsigma = 0 \\ \frac{\partial L}{\partial \nu} \Rightarrow \tilde{Q}P - \tilde{S} - \xi = 0 \end{cases} \tag{22}$$

yielding:

$$\begin{cases} \tau = -(\tilde{Q}P - \tilde{Y})^T \\ \nu = -\beta(\tilde{Q}P - \tilde{S})^T \\ \alpha P^T = -(\tilde{Q}P - \tilde{Y})^T\tilde{Q} - \beta(\tilde{Q}P - \tilde{S})^T\tilde{Q} \end{cases} \tag{23}$$

therefore, an optimal analytical solution can be expressed as:

$$P = \left(\alpha I + (1 + \beta)\tilde{Q}^T\tilde{Q}\right)^{-1}\left(\tilde{Q}^T\tilde{Y} + \beta\tilde{Q}^T\tilde{S}\right) \tag{24}$$

wherein I denotes an identity matrix.

6. The born-again TSK fuzzy classifier based on knowledge distillation according to claim 1, wherein a learning algorithm of CNNBaTSK has inputs comprising: training dataset $X=\{x_i, x_i=(x_1, x_2, \dots, x_n)^T, x_i \in R^n, i=1, 2 \dots, N\}$ and $\tilde{Y}=\{Y_i, Y_i \in \{0, 1, \dots, K\}, i=1, 2, \dots, N\}$ and a maximum iteration epoch $\tilde{l}$, initial learning rate $\theta$, distillation temperature T, regularization factors $\alpha$ and $\beta$, testing sample $x_{test}$ of the convolutional neural network; outputs comprising CNNBaTSK after completion of training, and the output $\tilde{y}_{test}$ of the testing sample; the learning algorithm of the CNNBaTSK comprises two stages as follows:

S1: training stage:

S10: initialization: initializing $W_t$ and $b_t$ with random numbers, and proceeding step S11 to step S13 sequentially within a range of the maximum iteration epoch $\tilde{l}$;

S11: inputting training samples $X=\{x_i, x_i=x_1, x_2, \dots, x_n)^T, x_i \in R^n, i=1, 2, \dots, N\}$, and performing a convolutional and pooling operation on the training samples through the Conv layer and the Pool layer to extract depth features;

S12: calculating a probability that the sample belongs to each label at the FC layer;

S13: performing error backpropagation on 1D-CNN according to a cross-entropy loss function formula;

S14: generating a probability distribution $E_i=(e_1, e_2)^T$ of the output layer after the iteration is completed;

S15: introducing the distillation temperature T and converting it into the soft label information $S=\{s_i=(s_1,s_2)^T, s_k \in [0,1], k=1,2, i=1,2, \ldots, N\}$;

S16: partitioning the antecedent part into five fixed fuzzy partitions, wherein the center of each fuzzy partition is $$c_d^m \in \{0, 0.25, 0.5, 0.75, 1\},$$

and the kernel width $$\sigma_d^m$$

is set at a random positive value which is between 0 and 1;

S17: computing a normalized membership $\tilde{\mu}^m(s_i)$ of the training sample in different rules;

S18: computing and generating $Q_i$, wherein the output of the CNNBaTSK can be expressed as $$\tilde{y}_i = Q_i^T P;$$

S19: computing an analytical solution for P to be: $P=(\alpha I+(1+\beta)\tilde{Q}^T\tilde{Q})^{-1}(\tilde{Q}^T\tilde{Y}+\beta\tilde{Q}^T\tilde{S})$;

S2: testing stage:

S21: inputting a testing sample $x_{test}$;

S22: generating the probability distribution $E_{test}=(e_1, e_2)^T$ of the output layer;

S23: computing the probability distribution $s_{test}=(s_1, s_2)^T$ of the output layer of the soft label information;

S24: computing a normalized membership $\tilde{\mu}^m(s_i)$ of the testing sample in different rules;

S25: outputting $\tilde{y}_{test}$ of the testing sample according to $$\tilde{y}_{test} = Q_{test}^T P.$$

7. A method for constructing a fuzzy rule for a born-again TSK fuzzy classifier based on knowledge distillation, wherein the born-again TSK fuzzy classifier based on knowledge distillation is denoted as CNNBaTSK, and the fuzzy rule of the CNNBaTSK comprises two parts: an antecedent part based on soft label information and a consequent part based on original data, and the method for constructing the fuzzy rule of the CNNBaTSK comprises following steps:

Step 1: taking, by the CNNBaTSK, the original data as input, obtaining a probability distribution of an output layer through a layer-by-layer neural expression, and introducing a distillation temperature to generate soft label information of DATASET;

Step 2: partitioning the soft label information into five fixed fuzzy partitions to construct the fuzzy rule in a fuzzy part of the CNNBaTSK;

Step 3: introducing the original data to calculate a consequent parameter, and optimizing the consequent parameter of CNNBaTSK using a non-iterative learning method.

8. The method for constructing the fuzzy rule according to claim 7, wherein in Step 2, each soft label information in different fuzzy rules have a center of {0, 0.25, 0.5, 0.75, and 1} respectively, and the soft label information is transformed into semantic interpretation to construct the fuzzy rule.

9. The method for constructing the fuzzy rule according to claim 7, wherein in Step 1, a specific method of generating the soft label information of DATASET comprises: firstly stacking multiple convolutional layers and pooling layers, in terms of layer by layer learning and generating a depth feature, the convolutional layers and the pooling layers used being disposed alternately, and then performing classification through several fully-connected layers and the output layer; the convolutional layer, the pooling layer, and the fully-connected layer are respectively denoted as a Conv layer, a Pool layer, and a FC layer;

assuming that a training dataset is $X=\{x_i, x_i=(x_1, x_2, \ldots, x_n)^T, x_i \in R^n, i=1, 2, \ldots, N\}$ and a label set is $\tilde{Y}=\{Y_i, Y_i \in \{0, 1, \ldots, K\}, i=1, 2, \ldots, N\}$, where n represents a sample dimension, N represents a sample quantity, and K represents a sample category; in a convolutional neural network, an output result (feature map) of a layer t is marked as $Z_t$, where $Z_0$ represents the original data $x_i$;

in the Conv layer, a local connection method is employed to execute a convolution calculation, and then a bias be is added to the feature map, and then an activation function $f(\cdot)$ is employed for a nonlinear transformation; and a calculation process for the Conv layer is as follows:

$$Z_t = f(W_t * Z_{t-1} + b_t) \tag{1}$$

after the convolution calculation is completed, a nonlinear mapping of the PRelu activation function is performed, wherein a mathematical expression of the PRelu is expressed as follows:

$$f(a) = \begin{cases} a, \text{ if } a > 0 \\ \kappa a, \text{ otherwise} \end{cases} \tag{2}$$

wherein $\alpha$ represents an input variable and $\kappa$ represents a slope coefficient;

in the Pool layer, a maximum value in a pooling window is selected as a result in a selected maximum pooling operation, and a pooling process can be expressed as follows:

$$Z_t = Pool(Z_{t-1}) \tag{3}$$

after several convolution and maximum pooling operations, an extracted depth feature is input into a first FC layer; in the FC layer, all neurons between layers are connected, and the depth feature is further mapped to a new feature space to complete a classification task;

calculation is performed through a weight $W_t$ and the bias $b_t$, and a nonlinear transformation is performed using the activation function $f(\bullet)$; and a calculation process is as follows:

$$Z_t = f(W_t \cdot Z_{t-1} + b_t) \tag{4}$$

an output layer of the convolutional neural network uses Softmax activation function, and an output thereof $Z_t=(z_1, z_2, \ldots, z_K)^T$ is transformed into a corresponding probability result $E_i==(e_1, e_2, \ldots, e_K)^T$, wherein K represents a total number of category, and its calculation process is $$e_K = \exp(z_K)/\sum_{k=1}^{K} \exp(z_k) \tag{5}$$

during the training process, a cross-entropy loss function is employed to measure a difference between the output of the convolutional neural network and a ground-truth label, and its calculation formula is as follows:

$$\min -\frac{1}{N}\sum_{i=1}^{N}\sum_{k=1}^{K} Y_{i,k} \log(e_k^{(E_i)}) \tag{6}$$

the weight $W_t$ and bias $b_t$ of the convolutional neural network are iterated and optimized through an error backpropagation algorithm; a loss value of formula (6) is backpropagated from a last layer to a first layer, and parameter updating is performed according to the error of each layer; assuming that assuming that a derivative of cross-entropy loss for the weight $W_t$ is $\Delta W_t$, and a derivative of cross-entropy loss for the bias $b_t$ is $\Delta b_t$, formula for parameter updating are expressed as follows:

$$W_t^l = W_t^l - \theta \Delta W_t^{l-1} \tag{7}$$

$$b_t^l = b_t^l - \theta \Delta b_t^{l-1} \tag{8}$$

wherein l represents a training iteration epoch and $\theta$ represents a learning rate;

in order to facilitate the distinction, a probability distribution of the output layer softened by the distillation temperature T is called the soft label information $s_i=(s_1, s_2, \ldots, s_K)^T$, and its calculation method is as follows:

$$s_K = \exp(z_K/T)/\sum_{k=1}^{K} \exp(z_k/T) \tag{9}$$

in a binary-class classification task, assuming that the training dataset is expressed as $X=\{x_i, x_i=(x_1, x_2, \ldots, x_n)^T, x_i \in R^n, i=1, 2, \ldots, N\}$, $\tilde{Y}=\{Y_i, Y_i \in \{0,1\}, i=1, 2, \ldots, N\}$ is a ground-truth label vector of the binary-class classification task; the probability distribution of the output layer $E_i=(e_1, e_2)^T$ is transformed into the soft label information $S=\{s_i=(s_1, s_2)^T, s_k \in [0,1], k=1,2, i=1, 2, \ldots, N\}$ after introducing the distillation temperature T, wherein the sum of all probabilities in each sample is 1, that is, $s_1+s_2=1$.

10. The method for constructing the fuzzy rule according to claim 9, wherein the Step 2, the CNNBaTSK adopts following fuzzy rules:

$$\text{In rule m: IF } s_1 \text{ is } *^\wedge s_2 \text{ is } * \text{ THEN } y^m = \tag{10}$$

$$p_0^m + p_1^m x_1 + p_2^m x_2 + \ldots + p_n^m x_n. \; m = 1, 2, \ldots, M$$

wherein * denotes the membership of fuzzy partition, M is the total number of fuzzy rules and $\wedge$ denotes a fuzzy conjunction operator, and the consequent part adopts a linear function of the input data $x_i$;

the antecedent part of the soft label information is taken into five fixed fuzzy partitions, wherein each fuzzy partition has a center of $$c_d^m \in \{0, 0.25, 0.5, 0.75, 1\},$$

and the kernel width $$\sigma_d^m$$

is set at a random positive value which is between 0 and 1; then, a Gaussian membership function as a fuzzy membership function is applied to estimate a membership of each rule, and its calculation method is as follows:

$$\mu_m(s_{i,d}) = \exp(-(s_{i,d} - c_d^m)^2/2\sigma_d^m) \tag{11}$$

$$\mu_m(s_i) = \prod_{d=1}^{2} \mu_m(s_{i,d})\mu_m(s_i) = \prod_{d=1}^{2} \mu_m(s_{i,d}) \tag{12}$$

a normalized membership function is formulated as follows:

$$\tilde{\mu}_m(s_i) = \mu_m\langle s_i \rangle / \sum_{m'=1}^{M} \mu_{m'}(s_i) \tag{13}$$

therefore, the output $\tilde{y}_i$ of the CNNBaTSK can be expressed as:

$$\tilde{y}_i = \sum_{m=1}^{M} \tilde{\mu}_m(s_i) y^m \tag{14}$$

making:

$$p^m = (p_0^m, p_1^m, \ldots, p_n^m)^T \tag{15}$$

$$P = ((p^1)^T, (p^2)^T, \ldots, (p^m)^T)^T \tag{16}$$

$$q_i^m = \tilde{\mu}_m(s_i)(l, x_i)^T \tag{17}$$

$$Q_i = ((q_i^1)^T, (q_i^2)^T, \ldots, (q_i^m)^T)^T \tag{18}$$

the output $\tilde{y}_i$ of the CNNBaTSK may be expressed as:

$$\tilde{y}_i = Q_i^T P. \tag{19}$$

11. The method for constructing the fuzzy rule according to claim 10, wherein in Step 3, a specific method for optimizing the consequent parameter of the CNNBaTSK is as follows:

an objective function is designed to balance the ground-truth label and the soft label information, and a following objective function for optimization is proposed:

$$\min \frac{1}{2}\sum_{i=1}^{N} s_i^2 + \frac{\alpha}{2}\|P\|_2^2 + \frac{\beta}{2}\sum_{i=1}^{N} \xi_i^2 \tag{20}$$

$$\text{s.t.} \begin{cases} Q_i^T P - Y_i = \varsigma_i \\ Q_i^T P - s_{i,2} = \xi_i \end{cases}, i = 1, 2, \ldots, N$$

wherein P is the consequent parameter of the fuzzy rule, $\alpha$ and $\beta$ are regularization factors, $\zeta_i$ is a deviation between the prediction output and the ground-truth label, $\xi_i$ is a deviation between the prediction output and the soft label information; based on $s_1+s_2=1$ and the ground-truth label, index of the probability $s_2$ is matched with the ground-truth label;

a Lagrangian optimization formula of the objective function can be expressed as:

$$L(P, \varsigma, \xi, \tau, v) = \tag{21}$$
$$\frac{1}{2}\|\varsigma\|_2^2 + \frac{\alpha}{2}\|P\|_2^2 + \frac{\beta}{2}\|\xi\|_2^2 - \tau(\tilde{Q}P - \tilde{Y} - \varsigma) - v(\tilde{Q}P - \tilde{S} - \xi)$$

wherein $\zeta=(\zeta_1, \zeta_2, \ldots, \zeta_N)^T$, $\xi=(\xi_1, \xi_2, \ldots, \xi_N)^T$, $\tau=(\tau_1, \tau_2, \ldots, \tau_N)^T$ and $v=(v_1, v_2, \ldots, v_N)^T$ are Lagrangian multipliers with equality constraints, and an input matrix is denoted by $\tilde{Q}=(Q_1, Q_2, \ldots, Q_N)^T$;

the consequent parameter P is calculated by setting a derivative gradient of the Lagrangian optimization formula with respect to (P, $\zeta$, $\xi$, $\tau$, $v$) equal to be zero, resulting in following KKT optimality conditions:

$$\begin{cases} \dfrac{\partial L}{\partial P} \Rightarrow \alpha P^T = \tau\tilde{Q} + v\tilde{Q} \\[2mm] \dfrac{\partial L}{\partial \varsigma} \Rightarrow \varsigma^T + \tau = 0 \\[2mm] \dfrac{\partial L}{\partial \xi} \Rightarrow \beta\xi^T + v = 0 \\[2mm] \dfrac{\partial L}{\partial \tau} \Rightarrow \tilde{Q}P - \tilde{Y} - \varsigma = 0 \\[2mm] \dfrac{\partial L}{\partial v} \Rightarrow \tilde{Q}P - \tilde{S} - \xi = 0 \end{cases} \tag{22}$$

yielding:

$$\begin{cases} \tau = -(\tilde{Q}P - \tilde{Y})^T \\[1mm] v = -\beta(\tilde{Q}P - \tilde{S})^T \\[1mm] \alpha P^T = -(\tilde{Q}P - \tilde{Y})^T \tilde{Q} - \beta(\tilde{Q}P - \tilde{S})^T \tilde{Q} \end{cases} \tag{23}$$

therefore, an optimal analytical solution can be expressed as:

$$P = \left(\alpha I + (1 + \beta)\tilde{Q}^T \tilde{Q}\right)^{-1}\left(\tilde{Q}^T \tilde{Y} + \beta\tilde{Q}^T \tilde{S}\right) \tag{24}$$

wherein I denotes an identity matrix.

12. The method for constructing the fuzzy rule according to claim 7, wherein a learning algorithm of CNNBaTSK has inputs comprising: training dataset $X=\{x_i, x_i=(x_1, x_2, \ldots, x_n)^T, x_i \in R^n, i=1,2 \ldots, N\}$ and $\tilde{Y}=\{Y_i, Y_i \in \{0, 1, \ldots, K\}, i=1,2, \ldots, N\}$, and a maximum iteration epoch $\tilde{I}$, initial learning rate $\theta$, distillation temperature T, regularization factors $\alpha$ and $\beta$, testing sample $x_{test}$ of the convolutional neural network; outputs comprising CNNBaTSK after completion of training, and the output $\tilde{y}_{test}$ of the testing sample; the learning algorithm of the CNNBaTSK comprises two stages as follows:

S1: training stage:

S10: initialization: initializing $W_t$ and $b_t$ with random numbers, and proceeding step S11 to step S13 sequentially within a range of the maximum iteration epoch $\tilde{I}$;

S11: inputting training samples $X=\{x_i, x_i=x_1, x_2, \ldots, x_n)^T, x_i \in R^n, i=1, 2, \ldots, N\}$, and performing a convolutional and pooling operation on the training samples through the Conv layer and the Pool layer to extract depth features;

S12: calculating a probability that the sample belongs to each label at the FC layer;

S13: performing error backpropagation on 1D-CNN according to a cross-entropy loss function formula;

S14: generating a probability distribution $E_i=(e_1, e_2)^T$ of the output layer after the iteration is completed;

S15: introducing the distillation temperature T and converting it into the soft label information $S=\{s_i=(s_1, s_2)^T, s_k \in [0,1], k=1,2, i=1,2, \ldots, N\}$;

S16: partitioning the antecedent part into five fixed fuzzy partitions, wherein the center of each fuzzy partition is $$c_d^m \in \{0, 0.25, 0.5, 0.75, 1\},$$

and the kernel width $$\sigma_d^m$$

is set at a random positive value which is between 0 and 1;

S17: computing a normalized membership $\mu'^m(s_i)$ of the training sample in different rules;

S18: computing and generating $Q_i$, wherein the output of the CNNBaTSK can be expressed as $$\tilde{y}_i = Q_i^T P;$$

S19: computing an analytical solution for P to be: $P=(\alpha I+(1+\beta)\tilde{Q}^T\tilde{Q})^{-1}(\tilde{Q}^T\tilde{Y}+\beta\tilde{Q}^T\tilde{S})$;

S2: testing stage:

S21: inputting a testing sample $x_{test}$;

S22: generating the probability distribution $E_{test}=(e_1, e_2)^T$ of the output layer;

S23: computing the probability distribution $s_{test} = (s_1, s_2)^T$ of the output layer of the soft label information;

S24: computing a normalized membership $\tilde{\rho}'''(s_i)$ of the testing sample in different rules;

S25: outputting $\tilde{y}_{test}$ of the testing sample according to $$\tilde{y}_{test} = Q_{test}^T P.$$

* * * * *